United States Patent

[11] 3,594,789

[72] Inventor Donald J. Rotier
St. Paul, Minn.
[21] Appl. No. 701,614
[22] Filed Jan. 30, 1968
[45] Patented July 20, 1971
[73] Assignee Honeywell Inc.
Minneapolis, Minn.

[54] COUNTER ACTUATED MULTIPLEX MONITOR CIRCUIT
6 Claims, 3 Drawing Figs.
[52] U.S. Cl. ..................................................... 340/413,
340/336
[51] Int. Cl. ..................................................... G08b 26/00
[50] Field of Search ........................................... 340/336, 412, 413

[56] References Cited
UNITED STATES PATENTS
3,293,605  12/1966  Moore .......................... 340/412
FOREIGN PATENTS
714,190  7/1965  Canada ........................ 340/412

*Primary Examiner*—Thomas B. Habecker
*Attorneys*—Roger W. Jensen, Charles J. Ungemach and Bruce C. Lutz

ABSTRACT: A multiplex monitor circuit providing output indications of out-of-tolerance signals from one or more of a plurality of test points. Test point signals are fed to a plurality of comparators whose outputs drive bistable circuits. The bistable circuits are sequentially enabled by a counter fed by their output pulses. A timer advances the counter in the absence of a bistable circuit output pulse and provides test point failure indication. Means for identifying the failed channel are also disclosed.

FIG. 1

INVENTOR.
DONALD J. ROTIER

BY Bruce C Lutz

ATTORNEY

FIG. 2A

PATENTED JUL 20 1971

INVENTOR.
DONALD J. ROTIER

BY Bruce C Lutz

ATTORNEY

COUNTER ACTUATED MULTIPLEX MONITOR CIRCUIT

THE INVENTION

The present invention is related generally to electronic circuitry and more specifically to a multiplex monitor circuit for providing output indications that one or more signals within a particular group of test points are in an out-of-tolerance condition and specifically identifying the location within the group of the test points having the out-of-tolerance signal.

With the increasing complexity of redundant control systems, the display of the status of the monitors can become a major item in the cost of a system. Weight limitations on system cabling dictate a system of monitor data multiplexing.

The monitor multiplexer of the present invention was designed to utilize the square wave output signals of a comparison monitor described in my U.S. Pat. No. 3,492,589 for "Control Apparatus," filed Apr. 3, 1967, and issued Jan. 27, 1970, or the rectangular pulse output of sampled middle select circuitry as described in my copending application for Control Apparatus, 657,480, filed Aug. 1, 1967.

It is an object of the present invention to provide a monitor data multiplexer utilizing a minimum amount of parts and having a high degree of fail safety.

Other objects and advantages of the present invention will be obvious from the specification and claims along with the drawing in which:

Figure 1:
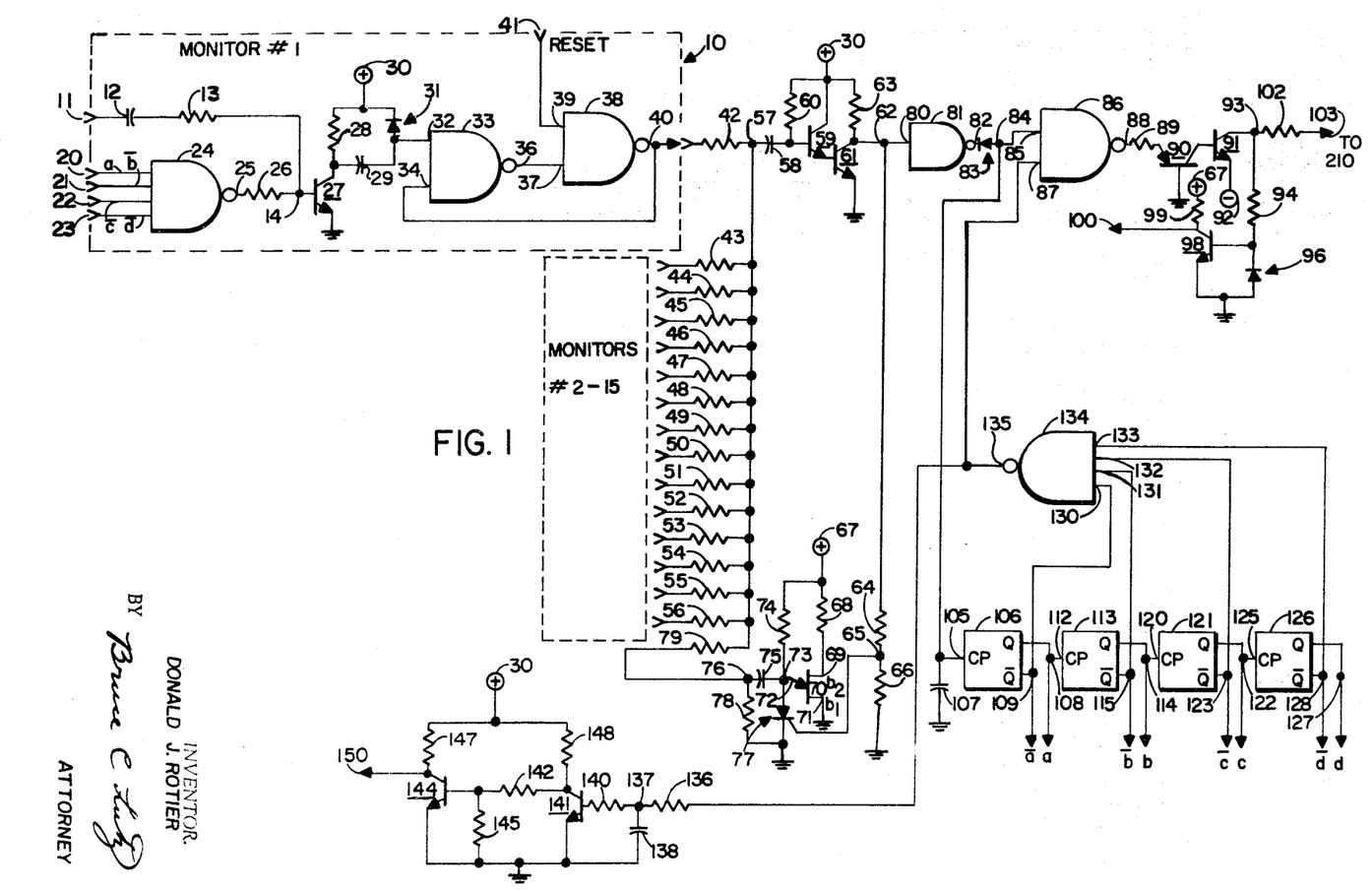
FIG. 1 is a schematic of a preferred embodiment of the multiplex circuitry for a single electronic assembly.

In FIG. 1 a schematic of a typical multiplex monitor circuit which may be located in a single electronic assembly is shown. A typical monitor circuit is shown enclosed within the dashed lines comprising block 10. A total of 15 such monitor circuits are mechanized in the embodiment shown, but only the monitor used in conjunction with test point no. 1 is fully illustrated in FIG. 1. A monitor input terminal 11 receives a monitor signal from a comparator circuit which provides a bipolar or square wave signal when the signal at the test point connected to the comparator input is within a predetermined tolerance band and provides a unipolar signal which may be a DC voltage or a zero level signal when the test point voltage exceeds the predetermined tolerance band. Comparator circuits providing such an output signal are described in my U.S. Pat. application Nos. 627,884, filed Apr. 3, 1967 and 657,480, filed Aug. 1, 1967 which are assigned to the same assignee as the present application. The input terminal 11 is connected to a series connection of a capacitor 12 and a resistor 13 to a junction 14. Terminals 20, 21, 22, and 23 comprise the inputs to a four input NAND gate 24. A NAND gate is a well known logic element which provides a logic "0" output only when all of its inputs are logic "1's." A logic "1" for the purposes of this specification shall hereinafter be treated as a positive voltage while a logic "0" shall be treated as a small voltage or a short circuit to reference or ground potential. An output terminal 25 of the NAND gate 24 is connected through a resistor 26 to a base of a grounded emitter NPN transistor 27. A collector of transistor 27 is connected to one end of a resistor 28 and one end of a capacitor 29. The other end of resistor 28 is connected to a source of positive voltage 30 and a cathode of a diode 31. For the remainder of this specification the direction of easy current flow through a diode shall be taken as from anode to cathode. An anode of diode 31 and the other end of capacitor 29 are connected to an input terminal 32 of a two input NAND gate 33 which has a second input terminal 34. An output terminal 36 of the NAND gate 33 is connected to an input terminal 37 of a NAND gate 38 which has a second input terminal 39. An output terminal 40 of the NAND gate 38 is connected to the input terminal 34 of the NAND gate 33. The input terminal 39 of the NAND gate 38 is connected to a reset terminal 41. The circuitry for monitor circuit 10 is representative of the monitor circuitry used to receive the output of comparators 2—15 within a particular electronic assembly.

The output terminal 40 of the two input NAND gate 38 is also connected to a resistor 42. The outputs of comparators 2—15 are processed by monitor circuitry similar to that of monitor 10 and their individual outputs are respectively connected to one end of resistors 43—56. The other end of resistors 42—56 are connected to a terminal 57. Terminal 57 is connected through a capacitor 58 to a base of an NPN transistor 59. A collector of transistor 59 is connected to the source of positive voltage 30. A base of transistor 59 is connected to the source of positive voltage 30 through a resistor 60. An emitter of transistor 59 is connected to a base of a grounded emitter NPN transistor 61. A collector of transistor 61 is connected to a terminal 62 and through a resistor 63 to the source of positive voltage 30.

A resistor 64 is connected between terminal 62 and a terminal 65. A resistor 66 is connected between terminal 65 and ground or reference potential. A source of positive voltage 67, which may be of the same magnitude as the source of positive voltage 30, is connected through a resistor 68 to a base two 69 of a unijunction transistor 70. A base one 71 of the unijunction transistor 70 is connected to ground or reference potential. An emitter 72 of the unijunction transistor 70 is connected to a terminal 73. A unijunction transistor is a three terminal device which switches to a condition of high conductivity between base one and base two and between the emitter and base one when an emitter voltage equal to or greater than a predetermined fraction of the interbase voltage is applied. A resistor 74 is connected between the terminal 73 and the source of positive voltage 67. Terminal 73 is also connected through a capacitor 75 to a terminal 76 and to an anode of a silicon controlled rectifier 77. A cathode of the silicon controlled rectifier 77 is grounded and a gate is connected to terminal 65. A silicon control rectifier has a low resistance between the anode and the cathode when a current in excess of a predetermined magnitude is injected into the gate. A resistor 78 is connected between terminal 76 and ground or reference potential. A resistor 79 is connected between terminal 76 and terminal 57.

Terminal 62 is connected to an input terminal 80 of an inverter 81. An output 82 of inverter 81 is connected to a cathode of a diode 83 which has an anode connected to a terminal 84. Terminal 84 is connected to an input 85 of a two input NAND gate 86 which receives a further input from an input terminal 87. An output terminal 88 of NAND gate 86 is connected through a resistor 89 to an emitter of a grounded base PNP transistor 90. A collector of transistor 90 is connected to a base of an NPN transistor 91 which has its emitter connected to a source of negative voltage 92. A collector of transistor 91 is connected to a terminal 93. Terminal 93 is connected through a resistor 94 to a cathode of a diode 96 and to a base of an NPN transistor 98. A collector of transistor 98 is connected to one end of a resistor 99, the other end of which is connected to a source of positive voltage 67. The collector is also connected to a terminal 100 which may be connected to reset circuits within the comparison circuitry. An emitter of transistor 98 is connected to an anode of diode 96 and to ground. Terminal 93 is connected through a resistor 102 to a signal output terminal 103.

Terminal 84 is connected to a clock or input terminal 105 of a bistable multivibrator or flip-flop 106 and to one end of a capacitor 107 the other end of which is connected to reference potential or ground. A noninverting or "$a$" output of flip-flop 106 is connected to a terminal 108. An inverting or "$\bar{a}$" output is connected to a terminal 109. The term multivibrator as used herein, pertains to any closed loop regenerative system having two or more stable or quasistable states, each of which is maintained without recourse to external forces. The application of a low energy content stimulus, a trigger, starts a switching action which drives the operating point away from one stable state and toward the next. A bistable multivibrator is a specific form of multivibrator which has absolutely stable states. The types of circuit which may perform the function of a bistable multivibrator are well known in the art and may be mechanized from but are not limited to vacuum tubes, transistors, or integrated circuits. The flip-flop circuits used herein change state when a waveform with negative slope or a zero potential is applied at a clock or input terminal. A clock or input terminal 112 of a bistable multivibrator or flip-flop 113 is connected to terminal 108. A noninverting or "b" output of flip-flop 113 is connected to a terminal 114 and an inverting or "$\bar{b}$" output is connected to a terminal 115. A clock or input terminal 120 of a bistable multivibrator or flip-flop 121 is connected to terminal 114. A noninverting or "c" output of flip-flop 121 is connected to a terminal 122 and an inverting or "$\bar{c}$" output is connected to a terminal 123. A clock or input terminal 125 of a bistable multivibrator or flip-flop 126 is connected to terminal 122. A noninverting or "d" output is connected to a terminal 128. The "a", "$\bar{a}$", "b", "$\bar{b}$", "c", "$\bar{c}$", "d", and "$\bar{d}$" outputs of the flip-flops are used to provide logic inputs to the input terminals of the four input NAND gates such as 24. For example, NAND gate 24 had terminal 20 connected to terminal 108 to receive the "a" input, terminal 21 connected to terminal 115 to receive the "$\bar{b}$" input, terminal 22 connected to terminal 123 to receive the "$\bar{c}$" input, and terminal 23 connected to terminal 128 to receive the "$\bar{d}$" input. The connections between the four input NAND gates such as 24 and the flip-flop outputs are not shown in FIG. 1 but are listed in Table 1 which lists the test point number and the four logic inputs that are applied to the NAND gate of the associated monitor circuit.

TABLE 1

| Monitor | Logic Inputs Applied to Gate | | | |
| --- | --- | --- | --- | --- |
| 1 | $a$ | $\bar{b}$ | $\bar{c}$ | $\bar{d}$ |
| 2 | $\bar{a}$ | $b$ | $\bar{c}$ | $\bar{d}$ |
| 3 | $a$ | $b$ | $\bar{c}$ | $\bar{d}$ |
| 4 | $\bar{a}$ | $\bar{b}$ | $c$ | $\bar{d}$ |
| 5 | $a$ | $\bar{b}$ | $c$ | $\bar{d}$ |
| 6 | $\bar{a}$ | $b$ | $c$ | $\bar{d}$ |
| 7 | $a$ | $b$ | $c$ | $\bar{d}$ |
| 8 | $\bar{a}$ | $\bar{b}$ | $\bar{c}$ | $d$ |
| 9 | $a$ | $\bar{b}$ | $\bar{c}$ | $d$ |
| 10 | $\bar{a}$ | $b$ | $\bar{c}$ | $d$ |
| 11 | $a$ | $b$ | $\bar{c}$ | $d$ |
| 12 | $\bar{a}$ | $\bar{b}$ | $c$ | $d$ |
| 13 | $a$ | $\bar{b}$ | $c$ | $d$ |
| 14 | $\bar{a}$ | $b$ | $c$ | $d$ |
| 15 | $a$ | $b$ | $c$ | $d$ |

Input terminals 130—133 of a four input NAND gate 134 are connected respectively to terminals 109, 115, 123, and 128 to receive "$\bar{a}$", "$\bar{b}$", "$\bar{c}$", and "$\bar{d}$" logic signals. An output terminal 135 of NAND gate 134 is connected to the input terminal 87 of the NAND gate 86. A resistor 136 is connected between the output terminal 135 and a terminal 137. A capacitor 138 is connected between terminal 137 and ground. A resistor 140 is connected between terminal 137 and the base of a grounded emitter NPN transistor 141. A collector of transistor 141 is connected through a resistor 142 to a base of a grounded emitter NPN transistor 144. A resistor 145 is connected between the base of transistor 144 and ground. A source of positive voltage 30 is connected through a resistor 147 to a collector of transistor 144 and through a resistor 148 to the collector of transistor 141. The collector of transistor 144 is also connected to a reset terminal 150 which is connected to reset terminals such as terminal 41 of monitor circuit 10.

Figure 2A:
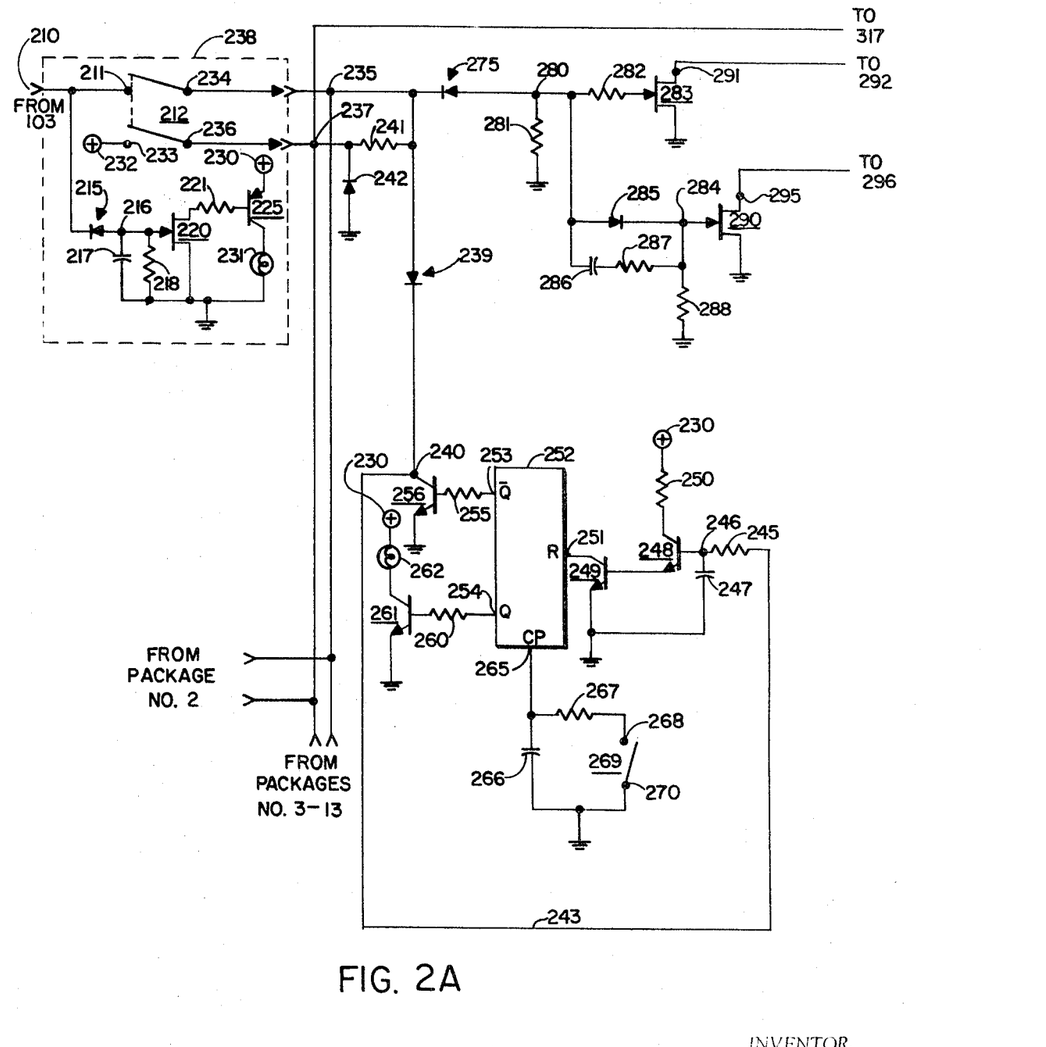
FIGS. 2A and 2B are a schematic of indicator circuitry utilized to indicate the status of one or more electronic assemblies.
Figure 2B:
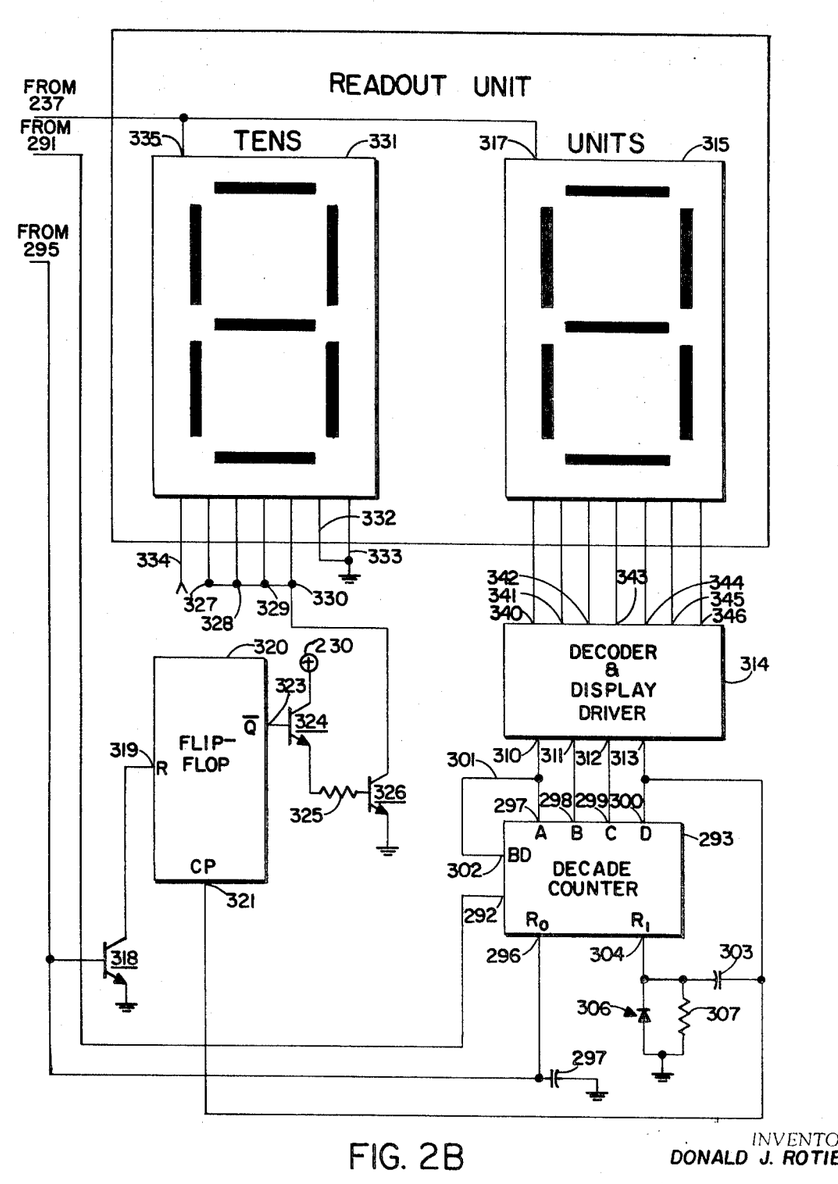

The circuit shown in FIGS. 2A and 2B may receive inputs from several remote multiplexers such as the multiplexer shown in FIG. 1. Fifteen remote circuits of the form of FIG. 1 are used with the circuitry of FIG. 2 in an illustrative embodiment. The signal from output terminal 103 of the multiplexer shown in FIG. 1 is transmitted to input terminal 210 of FIG. 2. The connection between terminal 103 and terminal 210 is made by means of a conductor in the preferred embodiment, but it is realized that the invention is not limited to the use of a conductor. Any means of transmitting the information between terminal 102 and terminal 210 may be used. For example, the information may be modulated and transmitted over a considerable distance before being converted to its original form and conducted to terminal 210. Terminal 210 is connected to a terminal 211 of a normally open, double-pole, single-throw, pushbutton switch 212. Terminal 210 is also connected to a cathode of a diode 215 which has its anode connected to a terminal 216. Terminal 216 is connected to a source of reference potential or ground through a parallel combination of a capacitor 217 and a resistor 218. Terminal 216 is also connected to a gate terminal of a field effect transistor (FET) 220. A source terminal of FET 220 is connected to ground and a drain is connected through a resistor 221 to a base of a PNP transistor 225. An emitter of transistor 225 is connected to a source of positive power 230. A collector of transistor 225 is connected to ground through an indicator load 231. The indicator load may be but is not limited to a light bulb, a relay solenoid winding or a buzzer. A source of positive power 232 which may be equal in voltage to the source of positive power 230 is connected to a terminal 233 of the pushbutton switch 212. A terminal 234 of switch 212 is connected to a terminal 235 and a terminal 236 of switch 212 is connected to a terminal 237. The electronic assembly failure indicating circuitry 210—234 and 236 is enclosed within a dash line box labeled 238 and comprises the failure indicator circuitry for a single electronic assembly. Further electronic assembly failure indicating circuits such as 238 are also connected to terminals 235 and 237.

Terminal 235 receives inputs from a multiplicity of failure indicators and is connected to an anode of a diode 239, the cathode of which is connected to a terminal 240. Terminal 235 is also connected through a resistor 241 to terminal 237 which is connected to a cathode of a diode 242 which has its anode connected to ground. Terminal 240 is connected through a conductor 243 to one end of a resistor 245, the other end of which is connected to a terminal 246. Terminal 246 is connected through a capacitor 247 to ground. Terminal 246 is also connected to a base of an NPN transistor 248 which has its emitter connected to a base of an NPN transistor 249. A collector of transistor 248 is connected through a resistor 250 to the positive voltage source 230. An emitter of transistor 249 is connected to ground. A collector of transistor 249 is connected to a "clear" input terminal of a bistable multivibrator or flip-flop 252 which has an inverting output 253 and a noninverting output 254. The inverting output 253 is connected through a resistor 255 to the base of a grounded emitter NPN transistor 256 which has its collector connected to terminal 240. The noninverting output 254 of flip-flop 252 is connected to one end of a resistor 260 the other end of which is connected to a base of a grounded emitter NPN transistor 261 which has its collector connected to one end of an indicator load 262 which may be but is not limited to a light, a solenoid winding, or a buzzer. The other end of the indicator load 262 is connected to a source of positive voltage 230. A clock or input terminal 265 of flip-flop 252 is connected through a capacitor 266 to ground. Input terminal 265 is also connected to one end of a resistor 267 the other end of which is connected to a stationary contact 268 of a normally open switch 269. A movable contact 270 of switch 269 is connected to ground.

Terminal 235 is also connected to a cathode of a diode 275 which has its anode connected to a terminal 280. Terminal 280 is connected to ground through a resistor 281 and is also connected through a resistor 282 to a gate of an N-channel FET 283 which has a grounded source terminal. Terminal 280 is also connected to a terminal 284 by a parallel combination of a diode 285 and the series combination of a capacitor 286 and a resistor 287. The anode of diode 285 is connected to terminal 280. Terminal 284 is connected to ground through a resistor 288 and is also connected to a gate of an N-channel FET 290 which has a grounded source terminal. A drain terminal 291 of FET 283 is connected to a clock input terminal 292 of a decade counter 293 in FIG. 2B. A drain terminal 295 of FET 290 is connected to an $R_0$ input terminal 296 of the counter 293. A capacitor 297 is connected between terminal 296 and ground. A binary coded decimal or BCD output from counter 293 is provided at an "A" terminal 297, a "B" terminal 298, a "C" terminal 299, and a "D" terminal 300. A conductor 301 connects the "A" output 297 to the "BD" input 302. A capacitor 303 is connected between the "D" output terminal 300 and an $R_1$ input terminal 304. The cathode of a grounded anode diode 306 is connected to terminal 304 and a resistor 307 is connected in parallel with diode 306.

The four binary coded decimal outputs of counter 293 are connected to input terminals 310, 311, 312, and 313 respectively of a decoder and display drive module 314. The decoder and display drive module 314 contains various logic circuits for converting the four-line BCD input to a seven-line output suitable for driving a seven-segment readout display. The outputs of the decoder and display drive are connected to a "units" seven-segment readout display 315 through conductors 340 to 346. The seven-segment display 315 is comprised of seven elements, each of which has a visible ON and OFF condition and is arranged as shown in the block labeled 315. The numerals from 0 to 9 are formed by turning the proper elements ON. A power input 317 of the "units" seven-segment display 315 is connected to terminal 237 in FIG. 2A.

Terminal 296 is connected to a base of a grounded emitter NPN transistor 318. A collector of transistor 318 is connected to a "clear" input terminal 319 of a flip-flop 320. A clock pulse input terminal 321 of flip-flop 320 is connected to the "D" terminal 300 of the decade counter 293. A $\bar{Q}$ or inverting output 323 of flip-flop 320 is connected to a base of an NPN transistor 324. A collector of transistor 324 is connected to the source of positive voltage 230 and an emitter of transistor 324 is connected through a resistor 325 to a base of a grounded emitter NPN transistor 326. A collector of transistor 326 is connected to input terminals 327, 328, 329 and 330 of a "tens" seven-segment display 331. Further input terminals 332 and 333 of the seven-segment display 331 are grounded and input terminal 334 is left unconnected. A power input 335 of the seven-segment display 331 is connected to terminal 237.

OPERATION

The circuit of FIG. 1 is typical of the type of circuit that is used in the multiplex monitoring system at one of a number of remote locations. Fifteen monitoring circuits such as the one shown for monitor 1 enclosed by box 10 are used to receive the output from 15 comparators which are usually located within the same electronic assembly.

The operation of monitor 10 is typical of the operation of the 15 monitor circuits with the exception that a different four-input logic statement is used to enable each monitor. Assuming that the logic statement applied to terminals 20, 21, 22 and 23 does not satisfy the statement $\overline{abcd}$; the signal at the output terminal 25 of the four-input NAND gate 24 will be a logic "1." A logic "1" is an open circuit or a positive voltage while a logic "0" is a short circuit to ground or a negative voltage. The positive voltage representing a logic 1 forces a current through resistor 26 and transistor 27 is biased "ON" providing a ground for one end of capacitor 29. After transistor 27 has been turned on for a sufficiently long time for steady state conditions to occur, capacitor 29 acts as an open circuit or a logic "1." The reset input terminal 41 also normally receives a logic "1" signal from terminal 150. The circuit formed by the combination of NAND gates 33 and 38 is bistable, that is a stable operating condition may be reached with logic "1's" applied to terminals 32 and 39 and either a logic "1" or a logic "0" existing at the output terminal 40. In practice, the prior history of the switching is determinative of whether the logic "0" or logic "1" is present. For ease of explanation, it will be assumed that the initial conditions require an output on terminal 40 to be a logic "1." With logic "1's" at input terminals 32 and 39 and a logic "1" assumed to exist at output terminal 40, input terminal 34 can also be seen to have a logic "1" input, thus requiring output terminal 36 to have a logic "0" signal. A logic "0" on input terminal 37 of NAND gate 38 and a logic "1" on input terminal 39 of NAND gate 38 are consistent with a logic "1" on output terminal 40 of NAND gate 38.

When the logic conditions for enabling the monitor no. 1 circuit as a monitor are satisfied, the output of the four-input NAND gate 24 switches from a logic "1" to a logic "0" and transistor 27 is turned OFF. As transistor 27 is turned OFF, the logic input to terminal 32 is unchanged and there is no change in the condition of the flip-flop circuit comprising NAND gates 33 and 38. When a transition of the bipolar or square wave signal from the comparator output applied to terminal 11 occurs the derivative of the signal, a pulse, is applied to junction 14. When a positive pulse is applied to junction 14, transistor 27 is turned ON momentarily and input terminal 32 of NAND gate 33 is momentarily grounded through capacitor 29. The momentary grounding of input terminal 32 is equivalent to a logic "0," and the combination of the logic "0" at input 32 and the logic "1" existing at input terminal 34 result in the output signal at terminal 36 of NAND gate 33 switching from a logic "0" to a logic "1." The combination of the logic "1" applied to input terminal 37 and the logic "1" applied to input terminal 39 of NAND gate 38 result in a change in the signal at NAND gate output 40 from a logic "1" to a logic "0." The logic "0" from output terminal 40 is fed back to input terminal 34 of NAND gate 33, the combination of the "0" at terminal 34 and the "0" at terminal 32 continuing to command a "1" at the output 36 of NAND gate 33. After the pulse at junction 14 has ceased, transistor 27 turns OFF and reapplies a logic "1" to input terminal 32 of NAND gate 33. The combination of the logic "1" at input terminal 32 and the logic "0" at input terminal 34 does not change the output 36 of NAND gate 33 from the logic "1" condition. When the logic signal for selecting the monitor circuitry 10 is switched OFF, four-input NAND gate 24 once again has a logic "1" at output terminal 25 and turns transistor 27 ON and momentarily applies a logic "1" to input terminal 32. The combination of a logic "1" on input terminal 32 and a logic "0" on input terminal 34 do not switch the output 36 from the logic "1" condition. After all the monitor channels have been enabled, a reset pulse having the form of a logic "0" is applied at reset terminal 41, applying a "0" input signal to input terminal 39 of NAND gate 38. The combination of the logic "0" input at terminal 39 and the logic "1" at input terminal 37 of NAND gate 38 results in a change of the output at terminal 40 from a logic "0" to a logic "1." When the logic "1" from output terminal 40 is fed back to input terminal 34 it is combined with the logic "1" signal on input terminal 32 and the signal at output 36 of NAND gate 33 switches from a logic "1" to a logic "0." The combination of the logic "0" at input terminal 37 and the logic "0" at input terminal 39 of NAND gate 38 does not switch NAND gate 38 from the logic "1" condition. The reset logic "0" is removed when a new sample cycle is begun and a logic "1" is reapplied to reset terminal 41 which is connected to input terminal 39. A logic "1" signal at input terminal 39 combined with a logic "0" signal at input terminal 37 of the NAND gate 38 does not result in a change in state of the output at terminal 40. When the reset signal is removed, a cycle of operation is completed and the initial conditions return.

If, in the initial conditions, a logic "0" had been assumed to exist at output terminal 40, the change in the logic signal applied to terminal 32 from a logic "1" to a logic "0" would not have resulted in a change of the signal at the output terminal 36. When the reset signal occurs, the output 40 would be switched from a logic "0" condition to a logic "1" and the initial conditions assumed in the explanation would be imposed. Therefore, although the output at terminal 40 could reasonably be assumed to be initially either a logic "0" or a logic "1," after a reset pulse occurs, the proper initial conditions will be imposed.

The output from terminal 40 of monitor circuit 10 and the outputs of the other monitors are individually passed through resistors 42 through 56 to terminal 57. The signal at terminal 57 is AC coupled through a capacitor 58 to transistor 59 which is turned ON by a bias current applied through resistor 60 when no signal is applied through capacitor 58. The current flowing through transistor 59 turns transistor 61 ON clamping the collector voltage of transistor 61 to a low voltage. When one of the monitor circuits undergoes a change from a logic "1" to a logic "0" at the output, the signal is coupled through the capacitor 58 momentarily back biasing transistor 59, turning OFF transistors 59 and 61 and causing the collector voltage of transistor 61 to momentarily approach the level of the positive power supply 30. Thus, the detection of a transition of the capacitor bipolar voltage applied to an input terminal such as 11, causes a momentary positive pulse to be generated at the collector of transistor 61 connected to terminal 62. As each monitor circuit senses the presence of the bipolar signal indicating an "in tolerance" test point and applies an output pulse to the capacitor 58, a single positive pulse is delivered to terminal 62.

The positive pulses from terminal 62 are transmitted to the voltage divider comprised of resistors 64 and 66. The signal at terminal 65 is applied to the gate of the SCR 77 which is turned ON each time a positive pulse is transmitted from transistor 61. When SCR 77 turns ON, capacitor 75 is discharged through the low impedance path through the SCR. When capacitor 75 is completely discharged, the current through the SCR drops to a low value and the SCR returns to the nonconducting state. Capacitor 75 is charged by the path comprised of resistor 74, capacitor 75 and resistor 78 when SCR 77 is turned OFF. Where the interval between the pulses from transistor 61 becomes long with respect to the charging time constant of capacitor 75, the voltage at terminal 73 becomes large enough to fire the unijunction transistor 70. When unijunction transistor 70 is fired, a low impedance path is formed between the emitter 72 and the base one 71, discharging capacitor 75, thereby producing a large enough change in the voltage at terminal 76 that the signal passed through resistor 79 to terminal 57 is large enough to trigger a positive pulse from transistor 61. Thus, the circuit comprised of unijunction transistor 69 and SCR 76 acts as a timing means to produce a pulse similar to the pulses produced by the monitor circuits whenever the time interval between successive monitor pulses exceeds a predetermined time interval.

The pulses from transistor 61 are also applied to an input 80 of inverter 81. Thus, the output at terminal 82 for a short positive voltage pulse applied at terminal 80 is a normally positive voltage with a short zero level transition during the period of the applied pulse. The output of inverter 81 is applied through a diode 83 to capacitor 107 and clock input terminal 105 of the flip-flop 106. Each time a pulse occurs on terminal 84, flip-flop 106 is triggered to change state. The noninverting output of flip-flop 106 is connected to terminal 108 and provides a trigger input at terminal 112 of flip-flop 113 which produces outputs having one-half the frequency of the output from flip-flop 106. The noninverting output of flip-flop 113 is connected to terminal 114 which applies an input at terminal 120 of flip-flop 121 which is driven at a frequency one-half that of flip-flop 113. The noninverting output of flip-flop 121 is connected to terminal 122 which applies an input to terminal 125 of flip-flop 126 which is driven at one-half of the frequency of flip-flop 121. Thus, the cascade connection of the four flip-flops, 106, 113, 121, and 126 comprises a counter, the outputs of which may be used in combinations of four to determine 16 unique logic functions to be used to enable the proper NAND gates in a predetermined sequence to sample the 15 signals.

The inverting outputs 109, 115, 123, and 128 of flip-flops 106, 113, 121, and 126 are used as the logic inputs to the four-input NAND gate 134. NAND gate 134 produces a logic "1" at the output until all four inputs have logic "1's" applied, at which time the output switches to a logic "0." When a logic "0" occurs on the output 135 of NAND gate 134, the current through resistors 136 and 140 is removed, eliminating the normal forward bias of transistor 141, turning transistor 141 OFF and raising its collector to a positive voltage approaching that of the positive voltage source 30. When the collector of transistor 141 is at a high voltage, a current is applied to resistor 142, forward biasing transistor 144 and turning it ON producing a low voltage at terminal 150. Thus, the combination of the NAND gate 134 and the transistors 141 and 144 serve to provide a reset pulse to reset all of the monitor circuits after each monitor has been sampled. Thus, the 16-place counter serves to sequentially enable each of the 15 monitor circuits and on the 16th count serves to reset all of the monitor circuits for the next counting cycle.

The reset pulse which appears at output terminal 135 of four-input NAND gate 134 is also connected to input terminal 87 of the two-input NAND gate 86 which receives its other input at terminal 85 from the output of the one input NAND gate 81. The output 135 of NAND gate 134 is normally a logic "1." The output of NAND gate 81 is also normally a logic "1."

The output, therefore, of two-input NAND gate 86 at terminal 88 is normally a logic "0." When positive pulses are applied to one input NAND gate 81, the momentary output "0's" are transmitted to input terminal 85 producing momentary logic "1's" at output terminal 88. After the counter has been advanced through 15 counts, NAND gate 134 switches to a logic "0" at approximately the same time NAND gate 81 switches to a logic "0" and a logic "1" is produced at the output terminal 88. After the 15 pulses have been received, indicating correct functioning of the 15 channel monitors, the counter comprised of the four flip-flops 106, 115, 121 and 126 remains in the zero condition which imposes a logic "0" on the output 135 of the NAND gate 134. The counter remains in this position until the timing means generates a pulse after the predetermined interval of about 1 second has elapsed following the 15th detected pulse. Thus, the output 135 of gate 134 is in a logic "0" condition for a fairly long time interval. The output 88 therefore of gate 86 for the entire cycle will show a chain of 15 short pulses corresponding to the pulses produced by the channel monitors and a long positive pulse whose length is determined by the time constant of the timing means. The output 88 of gate 86 is connected through a resistor 89 to the common base transistor 90 which acts as a level changer and is coupled to transistor 91. The signal on terminal 93 is connected to the collector of transistor 91 which is at zero volts when a logic "0" signal is present at output terminal 88 of gate 86 and switches to approximately the magnitude of supply 92 when the output terminal 88 carries a logic "1." The signal at terminal 93 is connected through resistor 102 to an output terminal 103.

In FIGS. 2A and 2B terminal 210 receives signals from terminal 103, which signals indicate the status of the monitor channels multiplexed by the multiplex circuit of FIG. 1. Circuitry similar to that enclosed in box 238 is provided for each of the other 12 individual multiplex circuits not shown in FIG. 2. An indication of the status of each multiplex circuit is obtained from indicators such as 231. The signal at terminal 210 is transmitted to FET 220 which is turned ON when its gate is forward biased with respect to the source terminal. Capacitor 217 and resistor 218 form a filter which causes the voltage at terminal 216 to slowly increase to a more positive voltage when negative pulses are not present. When the circuitry of FIG. 1 is correctly functioning, each cyclic interval will result in a series of 15 short closely spaced negative pulses separated by a long negative pulse whose width is determined by the time interval controlled by the circuit comprising SCR 76 and unijunction 69 in FIG. 1. It is this long negative pulse which biases terminal 216 to a negative voltage, turns OFF FET 220 and turns OFF the light or indicator 231. Thus, if the time interval of the unijunction SCR circuit is long with respect to the interval required to sample each of the channel monitor test points, the light 231 will be normally OFF.

When a failure occurs and a monitor circuit does not detect the bipolar or square wave signal, no pulse will be produced by this monitor and the circuit will delay the predetermined time interval before the pulse from the timing means causes an advance to the next monitor. Where a 1-second delay interval for the timing means and a 400 Hz. square wave are assumed, a single failure will result in the time interval required to sample all the pulses changing from approximately 50 milliseconds to 1 second plus 50 milliseconds. Thus, light 231 in the presence of a single failure will be turned ON after a delay due to the time constant of resistor 218 and capacitor 216 for approximately 1 second and OFF for approximately 1 second. Additional failures will result in a correspondingly longer period in which the light 231 is turned ON with respect to the period in which it is turned OFF with the light momentarily flickering as each failed monitor is sampled because of the time constant of resistor 218 and capacitor 216.

In the event that the operator of the system detects from the indicator 231 or any of the indicators associated with the other multiplex circuits that a failure is present, the appropriate pushbutton switch for that multiplex circuit may be depressed to connect that multiplex circuit to the display circuit which will indicate which of the monitored test points has sustained a failure. For example, switch 212 is used to connect the circuitry of FIG. 1 to the indicator circuitry. A signal is transmitted from terminal 210 through switch terminals 211 and 234 to terminal 235 which is the common signal input terminal for all of the multiplex circuits.

When the operator closes switch 212 to connect the circuitry of FIG. 1 to the display circuitry, a logic signal is conducted from the source of positive power 232 through the contacts 233, and 236 of the switch 212 to terminal 237 and through resistor 241. If transistor 256 is assumed to be turned OFF, the positive voltage is conducted back through terminal 235 and switch contacts 234 and 211 of switch 212 to terminal 210 and back to terminal 103 of FIG. 1. From terminal 103 the positive voltage is conducted through resistor 102 to terminal 93. At times when pulses are not present, transistor 91 is turned OFF and the positive voltage is conducted through resistor 94 and forward biases the base emitter junction of transistor 98, turning transistor 98 ON and switching the voltage at terminal 100 which is connected to the collector of transistor 98 from the supply voltage at 67 to a very small voltage. The switching from the large positive voltage to the small voltage at terminal 100 causes the individual comparators in the electronic assembly to be reset. The positive current conducted through resistor 241 is also conducted through diode 239 to the collector 240 of transistor 255. The current is then transmitted through conductor 243 and resistor 245 to terminal 246. The charging action of resistor 245 and capacitor 247 acts to limit the rise time of the voltage at terminal 246. After the voltage at 246 has risen to a sufficient potential to forward bias the base emitter junction of transistor 248, a current is conducted from the collector to the emitter of transistor 248 and injected into the base emitter junction of transistor 249. When a base current is injected into the base of transistor 249, the collector is clamped to ground and the "clear" input 251 of flip-flop 252 is connected to ground potential causing flip-flop 252 to reset to a condition where the output at terminal 253 is a logic "1" and the output at terminal 254 is a logic "0." When the output at terminal 253 is a logic "1" a positive current is forced through resistor 255 and the base emitter junction of transistor 256, clamping the collector terminal 240 to ground thus removing the "reset" command. The output at terminal 253 is switched from a logic "1" to a logic "0" and the indicator which is in series with the collector of transistor 261 is deenergized. Thus, the function of flip-flop 252 and its associated circuitry is merely to assure that a "reset" pulse is provided to reset the comparator circuit each time a reset pulse is commanded by the operator closing switch 269 connecting the "count" input terminal 265 of flip-flop 252 to ground through resistor 267. This "count" input causes flip-flop 250 to switch, turns transistor 261 ON and transistor 256 OFF until the positive voltage from the source of positive voltage 232 is applied by the closure of switch 212.

The pulse train which is produced by the circuitry of FIG. 1 is conducted to input terminal 210 and through the closed switch contacts of switch 212 when the FIG. 1 circuitry has been closed to drive the output display circuitry. The negative pulses cause a current to flow from ground through resistor 281 and diode 275 through junction 235, switch 212, junction 210, and junction 103, resistor 102 and the forward biased transistor 91 to the negative power supply 92. The current flow during a negative pulse produces a negative voltage at terminal 280. This negative voltage at terminal 280 back biases FET 283 through resistor 282 and turns transistor 283 OFF thereby producing a clock or input pulse at terminal 292 of decade counter 293 each time a negative pulse is received. The negative pulses at terminal 280 are also connected through a lag circuit 286 and 287 to a terminal 284. The negative voltage pulses at terminal 280 cause a current to flow through resistors 288 and 287 as well as capacitor 286. The voltage at terminal 284 slowly changes to a negative voltage causing FET 290 to turn OFF and producing a reset pulse at terminal 296 of the decade counter 293. The time constant of the circuit comprised of resistors 287 and 288 and capacitor 286 is selected so that FET 290 remains ON for the normal count pulses but turns OFF when the long negative pulse representing the completion of the timing cycle is received. Thus, for the normal timing cycle the 15 pulses representing the correct operation of the 15 individual test points provide trigger inputs for the trigger or a clock input 292. When the long negative pulse is received which denotes the completion of the sample cycle the counter is reset to zero until the pulse representing the beginning of a new sample cycle is received.

The pulses applied to the trigger or count input 292 of decade counter 293 drive the counter 293 to provide a binary coded decimal or BCD output at terminals 297, 298, 299, and 300. The connection between terminal 297 and terminal 302 is provided to force the particular decade counter used to function as a decade counter. Table II indicates the status of the output on terminals 297, 298, 299 and 300 for the various individual counts. It will

TABLE II

| Count | Logic Output | | | |
|---|---|---|---|---|
| | D | C | B | A |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 | be noted that the D output at terminal 300 switches from a logic "0" to a logic "1" when the "8" count is received and switches back to a logic "0" when the counter reaches the count of "10." A path is provided between terminal 300 and terminal 304 so that when the 8 count is produced a logic "1" pulse is AC coupled to the $R_1$ input terminal 304. The combination of the logic "1" at terminal 304 and a logic "0" which is present at $R_0$ terminal 296 combine to advance the counter to the "9" count. Thus, the counter 293 is a normal decade counter to the "9" count. Thus, the counter 293 is a normal decade counter producing a binary decimal output and advancing one count for each input pulse with the exception of the eighth pulse received after the counter has been reset. The eighth pulse causes the counter to advance two places. The reason that the counter is designed to skip the eighth position will be explained later.

The reset pulse which is delivered to terminal 296 of the decade counter 293 also serves to drive transistor 318 and to reset flip-flop 320 whenever the decade counter 293 is reset. When transistor 318 is turned ON a "clear" input is applied to terminal 319 and flip-flop 320 switches output terminal 323 to a logic "1" condition.

The binary coded decimal outputs of the decade counter 293 are delivered to the input terminal 310, 311, 312, and 313 of the decoder and display drive module 314. The decoder and display drive module 314 serves to translate the binary coded decimal output to a seven terminal output suitable for driving a seven segment display which is capable of reproducing the digits from 0 to 9. The outputs from the decoder and display module 314 are conducted on terminals 340 to 346 to the seven segment display module 315. The function of the counter 293, the decoder and display drive 314 and the seven segment display 315 is to receive input pulses at terminal 292 and produce a display output character on the seven segment display which indicates the number of pulses received since the counter was last reset. The numbers are formed from the seven segments in a display 315. Six elements of the display may also be checked for proper operation when the 0 count is displayed during the predetermined time interval after all channel monitors have been correctly checked and before the start of a new sample cycle. The counter 293 is programmed to skip the number 8 because in a seven segment display the number 8 is the only number that may be confused with another number upon the failure of a single segment of the total display if six of the elements are checked during the interval between sample periods. By forcing the counter to skip the 8 count there is no possible ambiguity between a displayed 8 and a displayed 0 if the center segment of the display is inoperative. Thus, the display contains novel, self-checking fail safe circuitry.

The "tens" digit is displayed on seven segment display 331. Since only 15 monitors are provided the only digits necessary in the "tens" column are the digits 0 and 1. Since the two segments are common to the numerals 0 and 1 two input terminals of the seven segment display are grounded to permanently turn ON the common segments. There are four segments necessary to form a zero in addition to the two common segments. These segments are connected in common to the collector of transistor 326. When the flip-flop 320 is reset and a logic "1" is produced at output terminal 323 the transistor 324 is forward biased and allows a current to flow from the source of positive voltage 230 through transistor 324 and the base resistor of transistor 325. The current flowing in resistor 325 forward biases the base of emitter junction of transistor 326 and clamps the collector of transistor 326 to ground producing a logic input to the "tens" display 331 causing the zero to turn ON and producing a numeral 0. The count input of flip-flop 320 receives an input from terminal 300 of the binary coded decimal counter 293. When the 8 and 9 counts are produced from the decade counter 293 a logic "1" is transmitted to the input terminal 321 of flip-flop 320. The transition from a logic "0" to a logic "1" at the input 321 of flip-flop 320 does not cause the flip-flop 320 to change state. When the decade counter switches from the 9 count to the 10 count the logic "1" at output terminal 300 is switched to a logic "0." The transition from a logic "1" to a logic "0" at the input terminal 321 of flip-flop 320 causes flip-flop 320 to change state and removes the logic "1" from the output 323, turning OFF transistors 324 and 326, ungrounding the four segments and switching the indication of the seven segment display from a numeral 0 to a numeral 1.

Thus, it may be seen that the circuitry of FIG. 2 serves two important functions. The plurality of indicators such as 231 serve to indicate a failure in a particular channel. The indicators such as 231 do not indicate which test point in the particular channel has sustained the failure. When the channel switch such as 212 is closed the seven segment displays 331 and 315 are energized and provide a highly reliable readout circuit for the identification of the particular test point which has failed within the already identified failed electronic package. When a particular electronic package has been selected with a switch such as switch 212, all of the comparison circuits within the selected electronic package may be reset by the operation of the reset switch 269.

The preferred embodiment thus provides for identification of failures of individual electronic packages and provides for a method of resetting the monitors within a package from the central monitoring location. The preferred embodiment further provides for the identification of the failed test point within a particular electronic package. Considerable saving of space and weight is provided by the use of the multiplexing scheme described as only 13 wires are necessary to provide information for 15 test points in each of 13 different electronic assemblies.

The circuitry of the preferred embodiment of the invention is designed to be "fail safe." In other words, a single failure of a component or a wire will not preclude the identification of a fault in a particular package. At worst the failure of a single component will cause a failure indication to appear when no failure is present or a failure in the monitor circuitry has occurred. A monitor circuit which upon failure produces a failure indication is, from a system standpoint, far more desirable than a monitor circuit which may fail and consequently prevent identification of an existing system failure.

Although the preferred embodiment shown in the drawings is for a system utilizing 15 test points for each of 13 electronic assemblies, it is obvious that no modification of the circuitry shown is necessary to expand the operation of the display circuitry of FIG. 2 to a larger number than 13 electronic assemblies. It is also obvious that the circuitry of FIG. 1, with appropriate modifications could be expanded to handle more than 15 test points per electronic package. Other alterations and variations will be obvious to those skilled in the art. I do not wish to be limited to the specification or the preferred embodiment shown in the figures but only by the following claims.

I claim:
1. A multiplex system for monitoring the performance of electrical apparatus wherein a plurality of comparator circuits are used to measure whether signals appearing at a plurality of test points within the apparatus have amplitudes within predetermined magnitude limits, where each of the comparator circuits normally produces a unipolar output signal only when the signal applied to the comparator is within the predetermined magnitude limits, comprising in combination:

a plurality of bistable monitors, each of said plurality of monitors having an input, an output, reset means and enabling means, the input connected to receive the output signal from one of said comparators, the reset means operable upon receipt of a reset signal, to set each of said plurality of monitors into a first stable state, and the enabling means operable upon receipt of an enabling signal to enable a bipolar signal at said input to switch the monitor between stable states;

timing means having an input and an output, the input of said timing means connected to the output of said plurality of bistable monitors to receive a signal therefrom, said timing means providing a signal at the timing means output when a predetermined time interval has elapsed without an input signal being applied at the timing means input;

pulse generating means for producing an output pulse each time a monitor circuit switches from a first to a second stable state and also each time an output signal is produced by said timing means, said pulse generating means having an input and an output, with the input of said pulse generating means connected to the output of said plurality of bistable monitors and to the output of said timing means;

a counter having an input and an output, the input of said counter connected to the output of said pulse generating means, the output of said counter connected to the enabling means of said plurality of monitors to sequentially and individually enable each of said plurality of monitors;

a first logic element connected to the output of said counter and generating a logical signal when the counter has received a number of pulses equal to the number of monitor circuits, the logic output of said first logic element connected to the reset means of said monitors; and a second logic element connected for receiving the output of said first logic element and the output of said pulse generating means and producing a logic output when a logic output is concurrently received from said first logic element and from said pulse generating means.

2. Apparatus of the class described in claim 1 wherein the output from said second logic element is passed to further means for producing an indication of the presence of a logic signal at the output of said second logic element.

3. Apparatus of the class described in claim 1 wherein a decade counter is connected to the output of said second logic element and is used to drive a numerical display to indicate the number of the comparison circuit which will supply the next pulse.

4. A circuit for indicating the absence of a bipolar signal at one or more of a plurality of test points, said circuit comprising in combination:

a plurality of bistable monitor circuits, each of said bistable monitor circuits having an input, an output, reset means and enabling means, the input of each of said plurality of monitors connected to one of said plurality of test points to receive the signal therefrom, the reset means operable upon receipt of a reset signal to set each of said plurality of monitor means into a first stable state, enabling means operable to allow a bipolar signal at said input to switch the monitor between first and second stable states when an enabling signal is applied, the monitor producing a first output signal when switching from the first to the second state;

a timer including an input and an output, the input of the timer connected to the output of said plurality of bistable monitors and producing a second output signal at the output when a predetermined time interval has elapsed without a signal being applied at the input means;

first means for producing an output pulse signal each time the first output signal is received from said monitors and each time the second output signal is received from said timing means, said means including an output and also including an input connected to the output of said plurality of bistable monitors and to the output of said timer;

a counter for generating enabling signals in response to input pulse signals, said counter including an input connected for receiving the pulse signal from the output of said first means and also including an output connected to the enabling means of said plurality of bistable monitors for applying enabling signals thereto to sequentially and individually enable each of said plurality of monitors;

a first logic element for generating a logic output signal when the counter has received a number of pulses equal to the number of monitors, connected between the output of said counter and the reset means of said monitors;

a second logic element connected to receive the output of the first logic element and the output of said first means, said second logic element producing a logic output when signals are concurrently received therefrom; and further electrical means connected for receiving the logic output of said second logic means, said further electrical means having an audible and a nonaudible indication, said further electrical means producing the audible indication until the logic output is received from said second logic element.

5. Signal deviation detection circuitry including input means for receiving a multiplicity of signals which may be divided into a plurality of signal groups to be monitored and also including output means, said signal deviation detection circuitry comprising, in combination:

a plurality of multiplex means for receiving a group of input signals, sequentially monitoring each signal of said group of input signals for a required characteristic and providing a single bipolar output signal which has a first wave shape when each signal of said group of input signals has exhibited the required characteristic being monitored and has a second wave shape if one of the group of said input signals fails to exhibit the required characteristic after a predetermined interval;

a plurality of indicator means each of which is connected by a single wire to one of said plurality of multiplex circuits for receiving the output signal therefrom, each of said indicator means responsive to the received signal to provide a sensory indication that one or more of the input signals has not exhibited the required characteristic.

6. Apparatus of the class described in claim 5 wherein display means for determining which of the group of input signals received by a particular multiplex circuit of said plurality of said multiplex circuits has failed and wherein further means are provided for connecting the display means to receive the output signal of said particular multiplex circuit.